(12) United States Patent
Bowen

(10) Patent No.: US 9,332,002 B1
(45) Date of Patent: May 3, 2016

(54) AUTHENTICATING AND AUTHORIZING A USER BY WAY OF A DIGITAL CERTIFICATE

(71) Applicant: Amazon Technologies, Inc., Reno, NV (US)

(72) Inventor: Peter Zachary Bowen, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 10 days.

(21) Appl. No.: 13/829,885

(22) Filed: Mar. 14, 2013

(51) Int. Cl.
*H04L 29/06* (2006.01)

(52) U.S. Cl.
CPC .................................. *H04L 63/0823* (2013.01)

(58) Field of Classification Search
CPC ....................................................... H04L 9/006

USPC ............................................................ 726/1
See application file for complete search history.

(56) References Cited

U.S. PATENT DOCUMENTS 6,377,810 B1 * 4/2002 Geiger et al. .............. 455/456.2
7,305,562 B1 * 12/2007 Bianco et al. ................. 713/186

* cited by examiner

*Primary Examiner* — Jacob Lipman
(74) *Attorney, Agent, or Firm* — Baker & Hostetler LLP

(57) ABSTRACT

An administrator may issue a credential to a user and may define a policy that authorizes its use based on a predefined location. The policy and the credential may be bound in a digital certificate signed by a trusted party. When the user operates a computing device to access a resource, the computing device may present the digital certificate to the resource. In turn, the resource may use the digital certificate to authenticate the user and to verify that the policy authorizes his or her access.

24 Claims, 9 Drawing Sheets

AUTHENTICATING AND AUTHORIZING A USER BY WAY OF A DIGITAL CERTIFICATE

BACKGROUND

Digital certificates are commonly used to authenticate users in computing systems to authorize access to computing resources. A digital certificate typically binds a credential with information identifying a user associated with the digital certificate. A computing system relies on the digital certificate to authenticate the user so that the user can thereafter access a computing resource by way of the computing system.

The credential typically includes a cipher and is issued to the user by an administrator that manages its uses. The administrator provides the credential and the information identifying the user to a certificate authority that generates the digital certificate in, for instance, an X.509 standard format.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
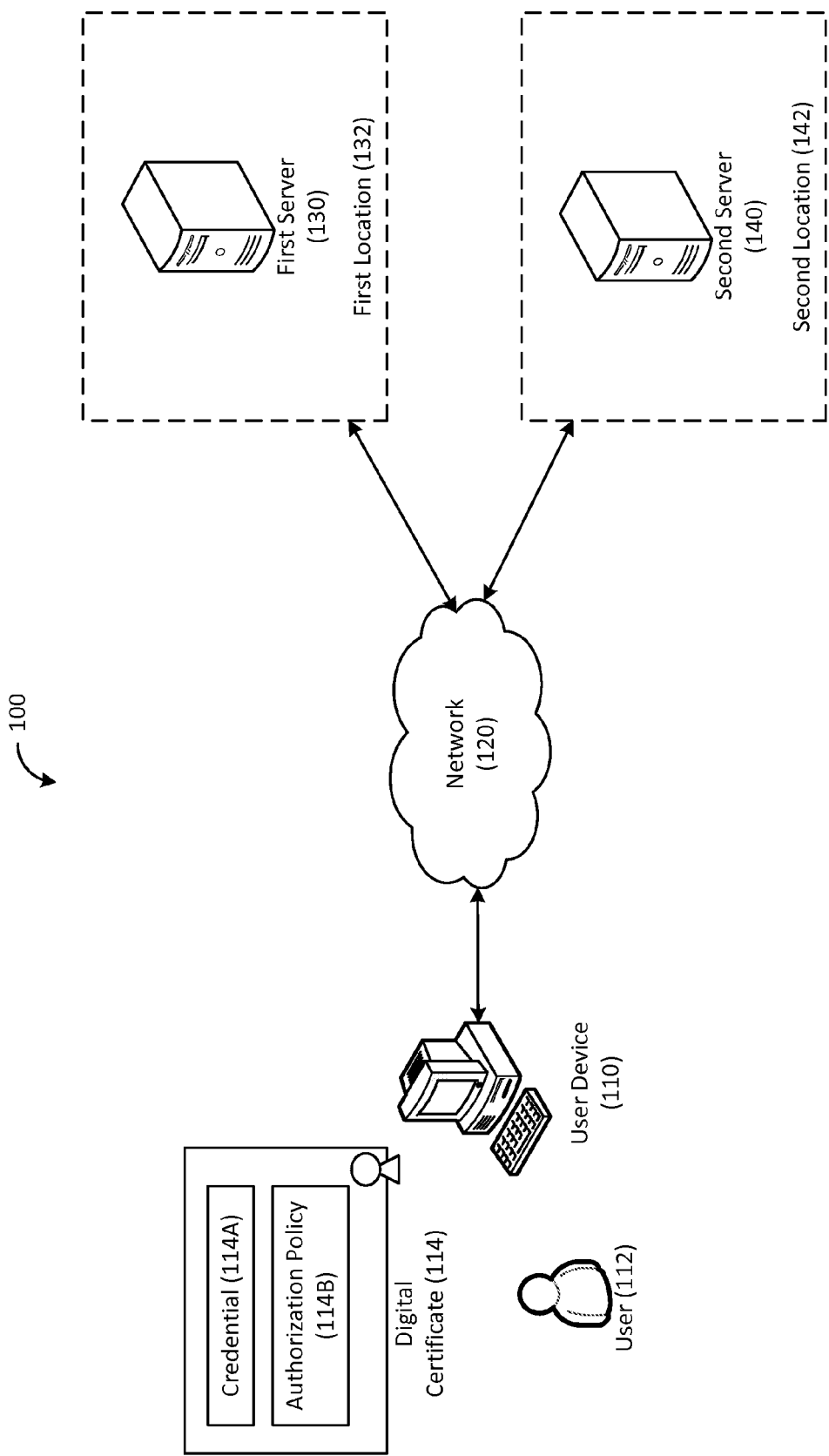
FIG. 1 illustrates an example system for using a digital certificate to control access by a user to computing environments.

The following detailed description is directed to techniques for employing digital certificates to control access of users to resources operated by a service provider across boundaries.

As noted above, an administrator typically issues a credential to a user to facilitate access by the user to one or more computing resources by way of the credential. As disclosed herein, the administrator can also associate an authorization policy with the credential. The authorization policy provides a basis for authorizing access to computing and other resources by the user associated with the credential based on various parameters such as location-based parameters. For instance, the authorization policy can indicate that the user's access to a resource should be restricted based on a location of the resource, a location of a user's computing device presenting the credential and so on.

The credential, the authorization policy and information identifying the user can be bound in the same digital certificate. When the user operates the computing device to request access to the resource by way of a system, the system authenticates the user based on the digital certificate and authorizes the access to the resource based on the authorization policy also contained in the digital certificate.

To generate the digital certificate, the administrator often sends the credential, the authorization policy and the information identifying the user to a trusted party. The trusted party, usually a certificate authority, digitally signs an electronic document that contains the credential, the authorization policy and the information identifying the user to generate the digital certificate. The resulting document is a digital certificate that not only attests to the association of the user and the credential, but that also controls the use of the credential by way of the authorization policy. Further, the digital certificate is protected against tampering by the digital signature of the trusted party.

The digital certificate is usually retained by the user on a storage medium such as a smart card, thumb drive, or other portable storage device that the user may use separate from the user's computing device. The user, in turn, can provide the credential to a computing device by way of a reader so that the computing device can, in turn, authenticate the user or provide the digital certificate to another system to authenticate the user. Additionally, the digital certificate can be stored on the user's computing device which can present it to the other system that authenticates the user.

As noted above, according to an aspect of the disclosure, an authorization policy is also included in the digital certificate. The authorization policy can limit permissions granted to the user such that a system can both authenticate a user and determine policy restrictions placed on the user by referring to the contents of the digital certificate and without the need for the system to refer to a separate authorization policy. In one example, the authorization policy may limit the user's access to a resource when the user is located outside of a predefined geographic boundary or when services hosted by the resource are not offered in a geographic area where the user operates.

As also noted above, the digital certificate is often issued to the user. In an example embodiment, the user is a real person or an entity that uses a computing resource such as a computing device or system. In another example embodiment, the user is a computing resource, a user account, or an administrative account that uses the digital certificate.

The following figures and embodiments describe the use of the digital certificate in the context of accessing a server. Nevertheless, other computing and non-computing resources are contemplated as falling within the scope of the disclosure. Example computing resources include datacenters, network-based resources, web servers, personal computing devices and the like. Example non-computing resources include resources with a controlled access to a facility such as entrances controlled by smart card readers.

The use of the digital certificate as disclosed herein can also include providing a certain type of services, accessing a certain type of data associated with the computing resources, or other type of operations available to the user. For example, in the context of datacenters, the digital certificate can be used to authorize the user to launch a virtual machine with a particular operating system but not with another operating system. Similarly, in the context of a web server, the web server may provide the user with a certain type of content based on the digital certificate. In the context of a facility, a smart card reader may process the digital certificate to authorize the user to access a particular floor of the facility but not others.

FIG. 1 illustrates an example embodiment of a system for using a digital certificate to control access of a user to servers. The controlled access includes an authentication of the user and a determination of one or more functions that the user is authorized to perform. In a basic configuration, system 100 of FIG. 1 includes a user device 110 in communication with a first server 130 and a second server 140 over a network 120. Network 120 may include communication networks of any type that are suitable for providing communications between user device 110 and servers 130 and 140 and may include a combination of discrete networks that may use different technologies. For example, network 120 may comprise a cellular network, a WiFi/broadband network, a local area network (LAN), a wide area network (WAN), a telephony network, a fiber-optic network or combinations thereof. In an example, the WiFi/broadband network may be adapted to communicate with the Internet. Network 120 may be also configured to transmit data between any of the components of system 100.

User device 110 is associated with a user 112 to whom a digital certificate 114 is issued and is configured to enable communications to servers 130 and 140 by way of digital certificate 114. User device 110 and servers 130 and 140 can employ various cryptographic protocols and other techniques to secure the communications. The cryptographic protocols include transport layer security (TLS) and secure sockets layer (SSL), which may be collectively referred to as TLS/SSL. Many of these cryptographic protocols and other security techniques involve the use of one or more encryption algorithms to encrypt data communicated between devices or components. The term encryption algorithm, as used herein, refers to any cipher, code or other technique used to encrypt communications. Such encryption algorithms include, for example, advanced encryption standard (AES) that uses symmetric key cryptography, Ron River Adi Shamir and Leonard Adleman (RSA) that uses asymmetric key cryptography and the like.

Digital certificate 114 may encode authorization information associated with user 112. In an embodiment, digital certificate 114 embeds a credential 114A associated with user 112 and an authorization policy 114B associated with user 112. Credential 114A typically includes information that facilitates functions that the user can perform such as accessing a resource. This information may be in the form of a secret, a code, a token, a cipher, a pair of private/public keys or any information derived by applying, for instance, a cryptographic technique to the particular permission.

Authorization policy 114B can include a rule that defines location restrictions associated with user 112 so that a system that authenticates the user can also use the location restrictions to authorize a request of user device 110 to access a computing resource. The locations restrictions allow the system to authorize the use of the digital certificate based on the location of the resource that user 112 attempts to access and also, in some instances, based on the location of user 112 when access is attempted.

In an example embodiment, first server 130 is associated with first location 132 and second server 140 is associated with second location 142. In response to receiving digital certificate 114 from user device 110, servers 130 and 140 verify that credential 114A is properly issued to user 112, authenticate user 112, and retrieve authorization policy 114B. Servers 130 and 140 also enforce authorization policy 114B by comparing the location restrictions defined by the rule included in the authorization policy to first and second locations 132 and 142. When, for instance, the rule includes a location that encompasses first location 132 but not second location 142, first server 130 authorizes a request for access, whereas second server 140 denies the request for access.

To further illustrate the operation of authorization policy 114B, the following describes various examples where first server 130 is located in Alaska, second server 140 is located in California. In a first example, authorization policy 114B restricts user 112 from accessing servers located outside of California. When user 112 operates user device 110 to access the information at first server 130, first server 130 uses the digital certificate to authenticate user 112. First server 130 also determines whether to authorize the operation using the authorization information embedded in digital certificate 114. Here, the server 114 determines that user 112 is not authorized to perform the operation on server 130 located in Alaska, based on authorization policy 114B. Consequently, server 130 denies user device 110 access to the information.

In comparison, when user device 110 presents digital certificate 114 to second server 140, this server may also follow a similar authentication and authorization procedure as first server 130. However, in this case, second server 140 authorizes user 112 to access the information because authorization policy 114B allows the use of the digital certificate in California, which is where second server 140 is located.

In another example, authorization policy 114B allows user 112 to access servers by way of the digital certificate when the user is located in Oregon. In this example, when user 112 operates user device 110 to connect to first server 130 that is in Alaska, first server 130 allows the user to access the information if user device 110 is located in Oregon at the time of the access.

In yet another example, authorization policy 114B allows user 112 to access servers by way of the digital certificate when the servers are located in California and when the user is also located in California when the user attempts to access the servers. In this example, first server 130 that is located in Alaska denies user device 110's access to the information regardless of the location of user 112. In comparison, second server 140 that is located in California allows user device 110 to access the information only when user 112 is also located in California.

The location restrictions may not be limited to geographic boundaries of states, but may also include other physical and non-physical boundaries. For example, the physical boundaries are based on a geographic region, a country, a city, an area code, a building, a floor of a building, a certain radius of a global positioning system (GPS) coordinate and the like. The non-physical boundaries can be logical boundaries that depend on how data is stored, managed and accessed. For example, servers 130 and 140 can store the information in different partitions that have different access levels such as in high, medium and low sensitivity groups. In comparison, the location restrictions can allow user 112 to access the data in the medium or low sensitivity groups. Thus, even when user 112 is authenticated and authorized to access the information, he or she is denied access to the data stored in the high sensitivity group by way of digital certificate 114.

In an embodiment, an official agency associated with a jurisdictional boundary can also mandate the location restrictions. For example, government agencies in the United States of America and in Germany may require cryptographic keys to be of different lengths. A first agency associated with one of the two countries may allow a use of 128-bit and 64-bit public keys while a second agency associated with the other country may limit the use to the 64-bit public key. As such, when the administrator issues credential 114A that includes one of the two types of public keys, the agencies require the administrator to restrict the use of credential 114A based on the key length. In this example, the administrator allows the user to use the 64-bit public key within any of the two countries and the use of the 128-bit public key within only the jurisdictional boundary of the first agency.

The rule may authorize the use of digital certificate 114 based on a destination location, a source location or a combination of the two locations. The destination location includes the location where the digital certificate is used such as the locations associated with the servers. An example of this rule is in the form of "the user of this digital certificate is authorized to use the digital certificate to access a resource that is located in California." For instance, when user 112 presents digital certificate 114 to servers 130 and 140, only second server 140 may authorize user 112's access by way of digital certificate 114 because second server 140 is located in California, whereas first server 130 is located in Alaska.

The source location includes the location from where the digital certificate is presented such as the location of the computing device at the time that it requests the access to the servers or the location of the user at that time. An example of this rule is in the form of "the user of this digital certificate is authorized to use the digital certificate when the user is located in Oregon." For instance, when user 112 presents digital certificate 114 to servers 130 and 140, the servers may authorize user 112's access by way of digital certificate 114 when user device 110 is located in Oregon. Otherwise, both servers deny the user's access regardless of their locations.

Figure 2:
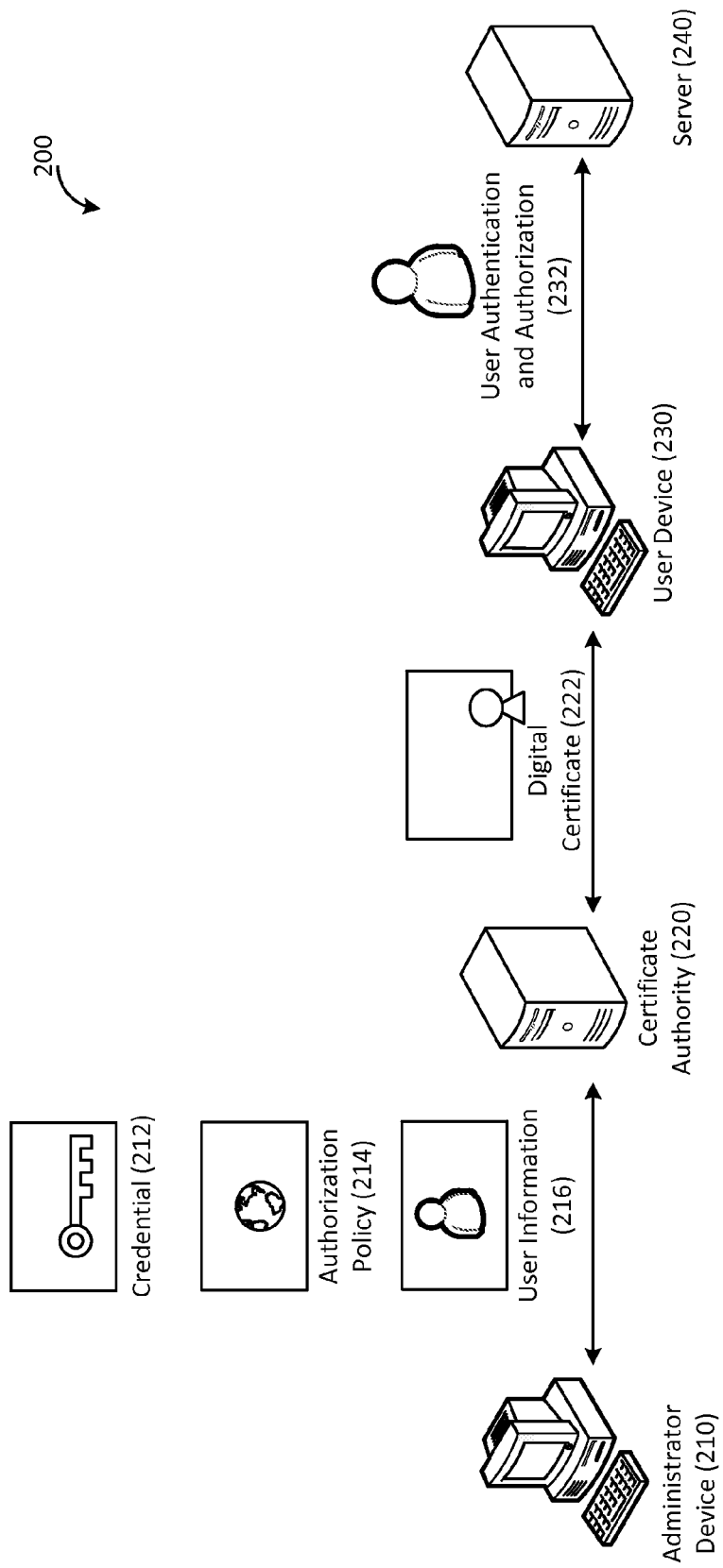
FIG. 2 illustrates an example end-to-end system for issuing a digital certificate that controls access by a user to a computing environment.

To generate digital certificate 114, the administrator may provide credential 114A, authorization policy 114B and the information identifying user 112, among other data, to the trusted party. FIG. 2 illustrates an example end-to-end system for issuing a digital certificate similar to digital certificate 114 of FIG. 1. The illustrated end-to-end system 200 may include some or all elements of system 100 of FIG. 1 and may include an administrator device 210, a certificate authority 220, a user device 230 and a server 240 interconnected by one or more communication networks and configured to issue and use the digital certificate.

An administrator operates administrator device 210 to issue a credential 212 to a user associated with user device 230. The administrator also defines an authorization policy 214 that restricts uses of credential 212, identifies the user in user information 216, e.g., a user's identity, name, address, contact information, and associates user information 216 with credential 212. These and other functions of the administrator can be executed on administrator device 210 that outputs credential 212, authorization policy 214 and user information 216. Administrator device 210 may also provide this output to certificate authority 220 or to user device 230 that may subsequently transmit the output to certificate authority 220.

In turn, certificate authority 220 verifies that user credential 212 is properly issued to the user based on user information 216 and binds authorization policy 214, user information 216 and user credential 212 in a digital certificate 222. Certificate authority 220 includes any computing device suitable for interaction with components of system 200 and is associated with a trusted third party that server 240 relies on to verify the user. For example, digital certificate 222 allows server 240 to trust that user credential 212 is properly issued to the user. Certificate authority 220 also transmits digital certificate 222 directly to user device 230 or, instead, to administrator device 210 that then transmits digital certificate 222 to user device 230. When the digital certificate is received, user device 230 stores and uses it to interact with server 240.

Server 240 performs a user authentication and authorization 232 procedure that involves authenticating the user based on digital certificate 222 and authorizing operations of the user based on authorization policy 214 embedded in digital certificate 222. For example, server 240 includes any computing device suitable for interaction with components of system 200 and for storing data and is configured to provide access to computing resources using various techniques. One technique includes encrypting data exchanged with user device 230 based on user credential 212 when the user is authenticated and authorized to exchange the data.

Administrator device 210, certificate authority 220 and user device 230 may be components of a public key infrastructure (PKI) system that is configured to generate, distribute, store, manage and revoke digital certificate 222. In an example, administrator device 210 is integrated with certificate authority 220 and/or user device 230. Likewise, user device 230 is configured to self-certify user credential 212 by integrating functionalities or elements of certificate authority 220. In another example, user device 230 is configured to issue user credential 212 and user information 216, whereas administrator device 210 is configured to generate authorization policy 214. In this example, certificate authority 220 receives user credential 212 and user information 216 from user device 230 and authorization policy 214 from administrator device 210 and issues digital certificate 222 accordingly.

Figure 3:
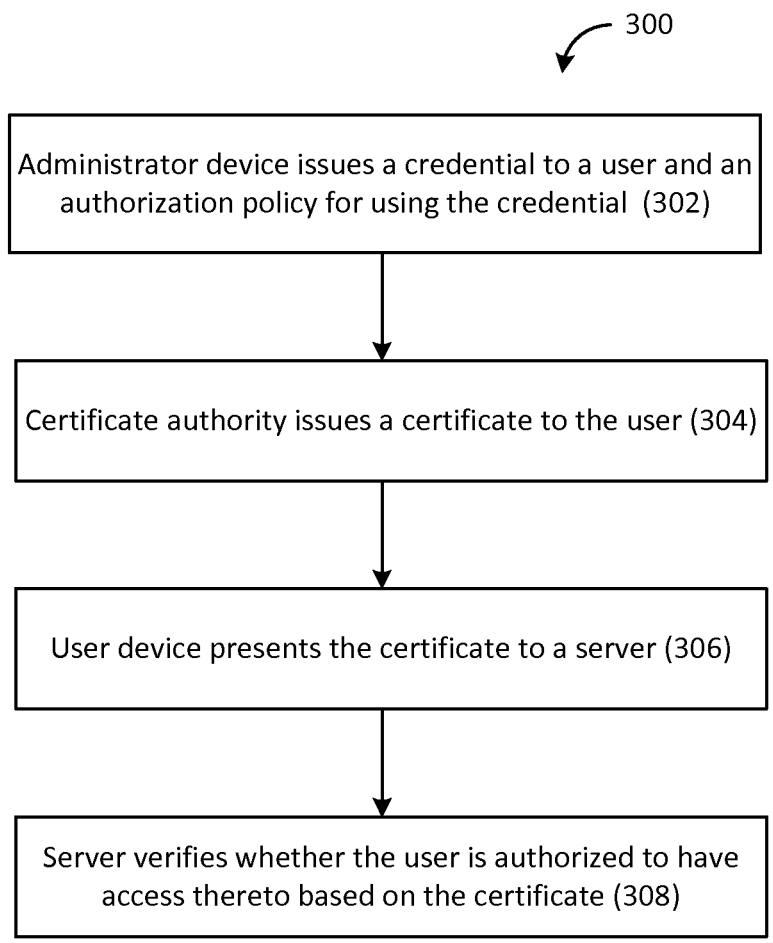
FIG. 3 is a flowchart depicting an example procedure for issuing a digital certificate that controls access by a user to a computing environment.

FIG. 3 is a flowchart depicting an example procedure that system 200 of FIG. 2 may perform to issue and use digital certificate 222. Operation 302 illustrates an administrator device issuing a credential to a user, such as a public key. The administrator device identifies the user and defines a policy that limits his or her use of the credential. Operation 304 illustrates a certificate authority generating a digital certificate and digitally signing the certificate with a private key of the certificate authority. The digital certificate includes, for example, the public key, the user information, the policy and the digital signature of the certificate authority. The certificate authority transmits the digital certificate to a user device associated with the user or to the administrator device.

Operation 306 illustrates the user device using the digital certificate to interact with a server, such as a web server associated with a service provider. For example, the user may wish to authenticate to the server to access resources offered by the service provider and may use a browser of the user device to connect to the server. In this example, when the user device connects to the server, the user is prompted to enter a password into the user device to unlock a database on the user device that stores a private key associated with the public key of the credential. The user is granted access to the private key and the user device uses the private key to sign randomly generated data. The signed data and the digital certificate are sent to the server.

Operation 308 illustrates the server authenticating the user and determining whether the user device is authorized to access the server based on the digital certificate. For example, to authenticate the user, the server determines that the digital signature that was used to sign the digital certificate is associated with the certificate authority, thereby validating that the digital certificate is authentic. In addition, the server verifies that the user device includes the private key associated with the public key embedded in the digital certificate. For example, the server uses the public key to validate the randomly generated data that was signed with the corresponding private key and that was sent to the server along with the digital certificate, thereby validating the user's identity.

As part of an authorization process, the server also processes the policy embedded in the digital certificate to determine whether to authorize an operation associated with a request from the user device. The server enforces the policy using various techniques that are further described in FIG. 6. One technique that the server may implement includes a comparison of a location restriction from the policy to its location or to the location of the user device and to authorize the operation based on the comparison. For example, when the policy indicates that the user is authorized to access content hosted on a resource in Texas and when the server hosts content in such a location, the server provides the user device access to the content. Further, the policy can require the server to alert the administrator when the user attempts to use the digital certificate in a non-authorized way. Thus, when the server hosts content in Arizona that the user device attempts to retrieve by way of the digital certificate, the server sends a communication to the administrator device.

In comparison to FIGS. 2 and 3, FIGS. 4 and 5 illustrate examples of another system and procedure, respectively, for issuing the digital certificate where only the administrator device is configured to generate the authorization policy. More particularly the illustrated system 400 of FIG. 4 includes a user device 410, a certificate authority 420 and an administrator device 430 interconnected by a network and may implement some or all elements of system 200 of FIG. 2. User device 410 is configured to generate a credential 412A and user information 412B and to transmit this information to certificate authority 420. In parallel, administrator device 430 is configured to generate an authorization policy 412C that controls uses of credential 412A based on locations and to transmit such a policy to certificate authority 420. In turn, certificate authority 420 verifies the information received from user device 410 and generates a digital certificate 422 that includes the credential and the policy and digitally signs the digital certificate using a certificate authority private key 424.

In an example, user credential 412A includes a public key that is associated with a private key of the user. Although a pair of asymmetric keys is described in FIG. 4, other type of keys, such as a pair of symmetric keys or other techniques, may be implemented to generate credential 412. The public/private keys are randomly generated by a key generation module implemented at administrator device 430, user device 410 or another computing device coupled to either device. The private key is only known to user device 410, whereas the public key is shared with certificate authority 420. User information 412B is based on an identity of the user and includes, for example, a name, an address, contact information and so on.

Authorization policy 412C is defined by an administrator of user device 410 and is not necessarily based on the identity of the user. Instead, authorization policy 412C is based on a requirement that is defined by the administrator or by an official agency and that mandates a boundary within which credential 412 may be used. The administrator uses administrator device 430 to generate such a policy.

Certificate authority 420 signs digital certificate 422 using certificate authority private key 424 to bind credential 412A, user information 412B and restriction 412C together and transmits digital certificate 422 to user device 410. Certificate authority private key 424 is generated by a key generation module that is implemented at certificate authority 420 and that outputs a pair of keys. The pair of keys typically includes a certificate authority public and certificate authority private key 424. This public key is published and shared with user device 410. In comparison, certificate authority private key 424 is kept as a secret and is only known to certificate authority 420.

Digital certificate 422 not only provides a verification that credential 412A is properly associated with the user based on, for example, user information 412B, but also provides a verification that the user is authorized to use credential 412A according to authorization policy 412C. Because digital certificate 422 is signed with certificate authority private key 424, user device 410 or any other non-certificate authority computing device can retrieve, decrypt and read authorization policy 412C using the certificate authority public key but cannot alter or tamper with authorization policy 412C.

Figure 4:
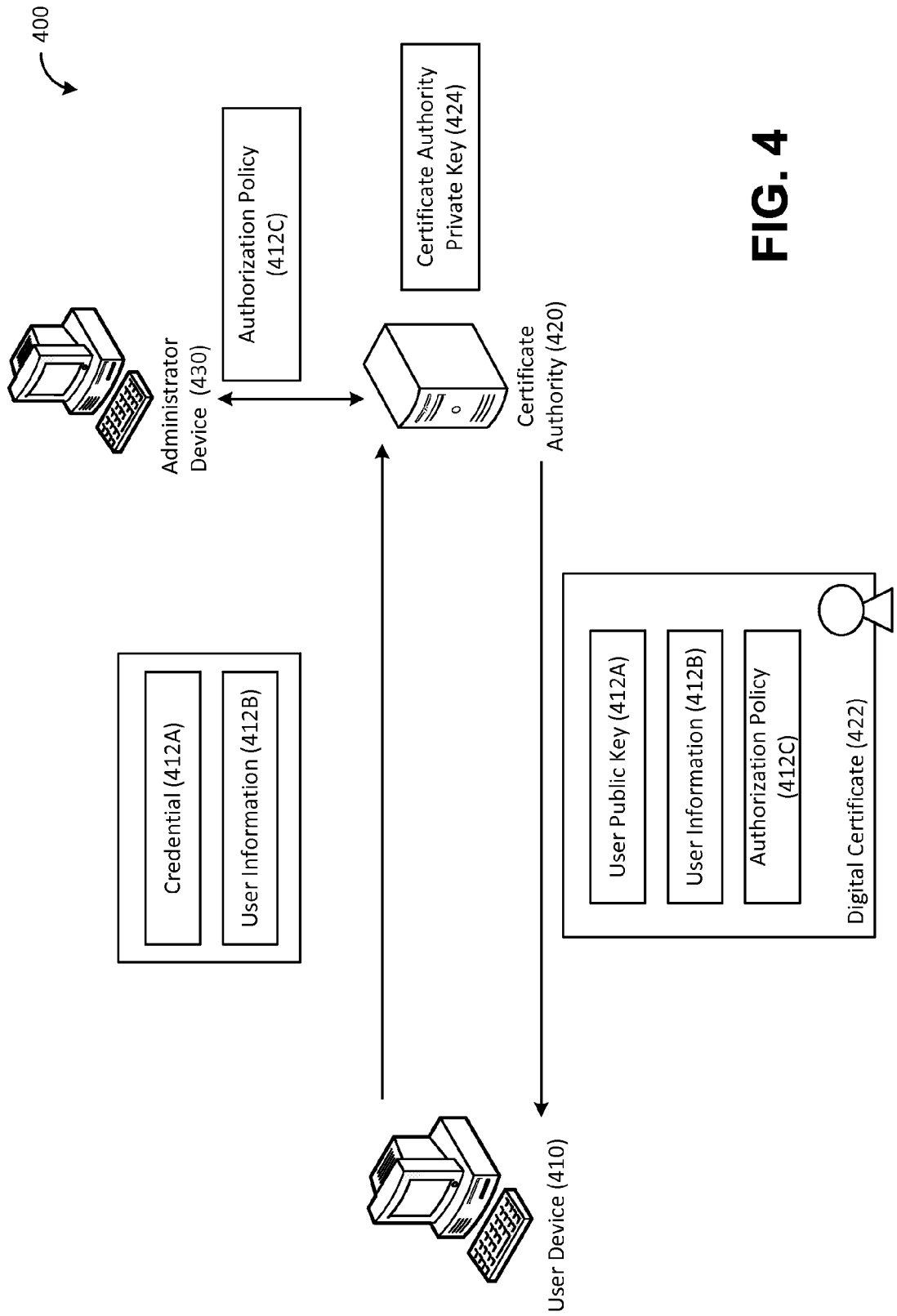
FIG. 4 illustrates an example system for issuing a restriction on a use of a credential to a user.
Figure 5:
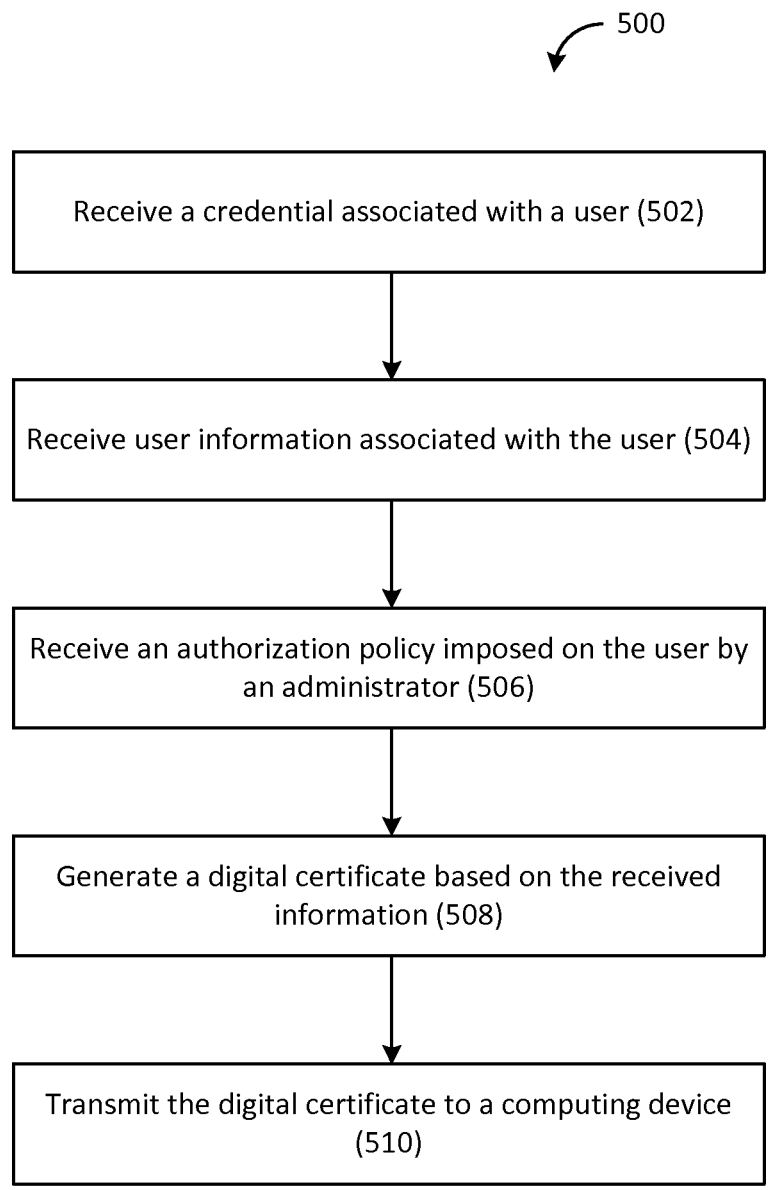
FIG. 5 is a flowchart depicting an example procedure for issuing a restriction on a use of a credential to a user.

FIG. 5 is a flowchart depicting an example procedure for issuing digital certificate 422 to a user and may be performed by system 400 of FIG. 4. Operation 502 illustrates a certificate authority receiving a credential associated with the user. A user device associated with the user or an administrator device associated with an administrator that manages credentials issued to the user transmits the credential to the certificate authority. Operation 504 illustrates the certificate authority receiving user information from the user or administrator device. Operation 506 illustrates the certificate authority receiving an authorization policy associated with the use of the credential from the user or administrator device. The authorization policy is defined by the administrator and describes a location restriction where the credential may be used.

The credential, the user information and the authorization policy are transmitted in the same or in a different data transmission to the certificate authority. For example, when the administrator device issues the credential to the user, the administrator device automatically transmits all three pieces of information to the certificate authority. In another example, when the user device receives the credential from the administrator device or when it generates the credential and determines that the credential needs to be signed, the user device transmits the credential to the certificate authority and notifies the administrator device of such a transmission. In turn, the administrator device transmits the restriction to the certificate authority with a request to bind it to the credential and the user information.

Operation 508 illustrates the certificate authority generating the digital certificate. In an example, the certificate authority verifies that the user is properly associated with the credential. The verification can include a domain validation or extended validation. For example, the trusted party contacts the administrator to verify the credential by way of an electronic communication, such as an email sent to a known address of the administrator. The electronic communication describes, hashes, or copies the credential, the user information and the authorization policy and embeds a link for approving the information. Once approved, the certificate authority assembles the credential, the user information and the authorization policy in a document and signs the document using a private key associated with the certificate authority to generate the digital certificate. Operation 510 illustrates the certificate authority transmitting the digital certificate to the user or administrator device.

Once the digital certificate is issued to the user, the user can operate the user device to present the digital certificate to a server. The server uses the digital certificate to facilitate an operation of the computing device based on the authorization policy embedded in the digital certificate. For example, the server facilitates a connection of the computing device to the server or to a computing environment that the server may be associated with. The computing environment uses the server or components other than the server to further authenticate the user and authorize the user device to access resources associated with the computing environment.

Figure 6:
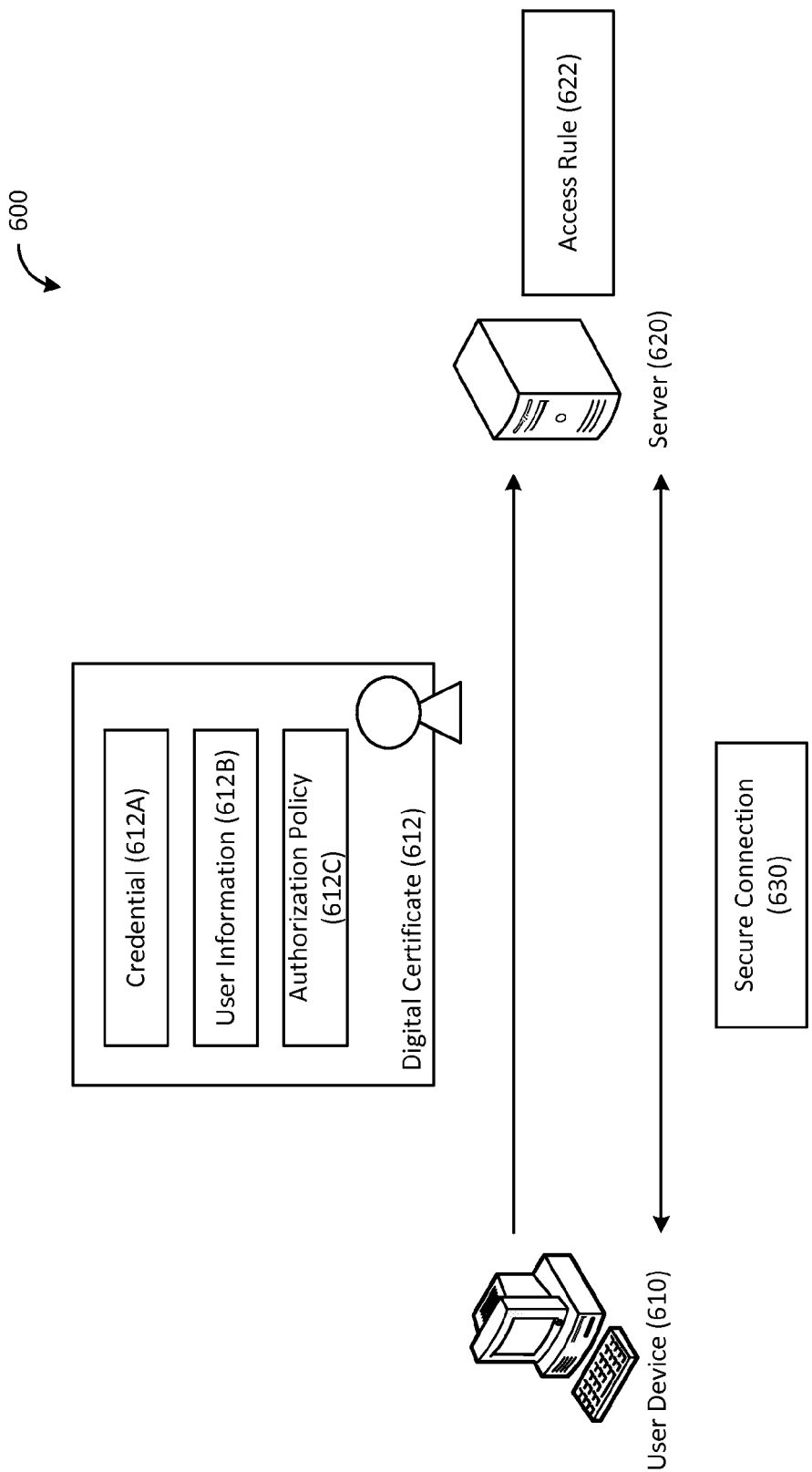
FIG. 6 illustrates an example system for authorizing an operation of a user based on a policy embedded in a digital certificate.

FIG. 6 illustrates an example system for using the digital certificate to authenticate the user and to authorize his or her operations in conjunction with access to computing resources gated and services provided by the server. The illustrated system 600 includes a user device 610 and a server 620 interconnected by a communication network and may implement some or all elements of system 100 of FIG. 1, system 200 of FIG. 2 and system 400 of FIG. 4. User device 610 stores a digital certificate 612 that is issued to the user and that is similar to digital certificate 422 of FIG. 4, for example. More particularly, digital certificate 612 binds a credential 612A, user information 612B and an authorization policy 612C.

Server 620 may include some or all elements of servers 130 and 140 of FIG. 1 or any computing device that can be used as part of an access point to a network-based service. The network-based service includes, for example, a website hosting service, a logon service for logging into computers, a multimedia content streaming service, a compute service, a data storage service and the like.

Access to the functionality provided by any of the services associated with server 620 may be performed in various ways that include enforcing authorization policy 612C independent of an access rule 622 associated with the server or in conjuncture with the access rule. When the enforcement is independent of access rule 622, server 620 authenticates the user based on digital certificate 612, retrieves authorization policy 612C and allows the use of credential 612A based on the rule specified in the policy. For example, after authenticating the user and determining that he or she is authorized to access the multimedia content streaming service based on digital certificate 612, server 620 encrypts the multimedia content with credential 612A and streams the encrypted content to user device 610. Likewise, to provide the website hosting service, server 620 and user device 610 can establish a secure connection 630 that uses a TLS protocol. This secure connection can use credential 612A along with a server's public key in a TLS handshake to establish a secret that is shared and used to encrypt data exchanged between client device 610 and server 620.

When access rule 622 is used in conjuncture with authorization policy 612C, the access rule is configured to provide another authorization layer for authorizing the user to access the computing resources or services associated with server 620. In an example, access rule 622 includes a profile that is associated with the user and that specifies the operations that the user can perform. In this example, the digital certificate can be provided to the user in the form of smart card that can be inserted in user device 610. However, when the smart card is lost or stolen, the user's profile is updated to indicate this status and to specify that access to server 620 by way of the digital certificate should be denied. Thus, when a third party inserts the smart card into a computing device and connects to server 620, the server does not authorize the access of the third party.

In another example, access rule 622 may allow server 620 to provide user device 610 with partial access to the services even when the user is authenticated and authorized based on digital certificate 612. In this example, server 620 may host two sets of content that are located in Ohio. Access rule 622 requires the server to stream the first set using a 40-bit key encryption and the second set using a 60-bit key encryption. Although authorization policy 612C allows the user to access content hosted in Ohio, when credential 612A is a 40-bit key, server 620 streams the first set of content to user device 610 and denies access to the second set.

Further, access rule 622 may be configured to customize the access to server 620. For example, when two users are issued two different digital certificates that contain the same authorization policy, access rule 620 can differentiate the services provided by server 620 to both users. In this example, after authenticating and authorizing each user based on the corresponding digital certificate, access rule 622 authorizes server 620 to provide access of the first user to all of its services and access of the second user to only the website hosting and multimedia content streaming services.

Figure 7:
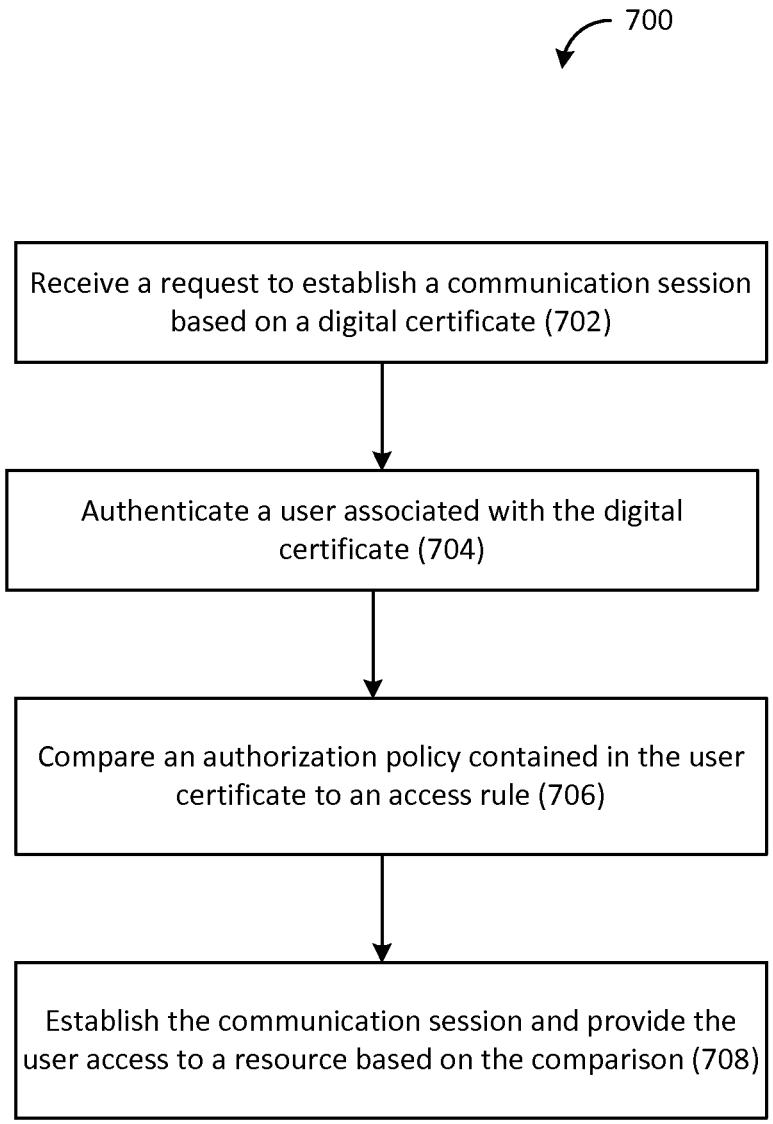
FIG. 7 is a flowchart depicting an example procedure for authorizing an operation of a user based on a policy embedded in a digital certificate.

FIG. 7 is a flowchart depicting an example procedure that a server, such as server 620 of FIG. 6, may perform to provide access to the user device by way of the digital certificate and the access rule as applicable. Operation 702 illustrates the server receiving a request to establish, for example, a secure communication session using a SSL protocol based on the digital certificate. Operation 704 illustrates the server authenticating the user based on the digital certificate. This authentication is performed based on, for example, a lightweight directory access protocol (LDAP) that is included in the access rule of the server.

Operation 706 illustrates the server comparing the authorization policy of the digital certificate to requirements of the access rule after authenticating the user to determine the level of access that the user is authorized to have. Operation 708 illustrates the server establishing the secure communication and providing the user device access to the computing resources and services associated with the server based at least in part on the comparison. For example, the authorization policy allows the user to use his or her public key to only access a computing resource in Utah while the access rule requires the server to strictly adhere to the policy. In this case, if the requested computing resource is located outside of Utah, the server denies the user device from accessing the resource and terminates the secure communication session. If the access rule also requires the server to notify an administrator of the user of a violation of the policy, the server retrieves contact information of the administrator from the digital certificate and sends a notification in the form of an electronic communication to an address contained in the contact information.

When the user device is provided access to the server, its resources or its services, such an access includes various uses of the user's credential. One use includes establishing secure communications between the user device and the server. For example, the user's credential is used to generate a new key that is shared between the user device and the server and that is used to encrypt subsequent communications between the two network nodes. A second includes encrypting data that is uploaded to the server. For example, when the user device transmits data to the server for storage, the server encrypts the data using the user's credential. Yet another use includes retrieving data stored on the server. For example, the server generates a temporary key and encrypts data stored at the server with this key. To provide the user device access to the encrypted data, the server encrypts the temporary key with the user's public key and transmits the encrypted data and the encrypted temporary key to the user device. In turn, the user device decrypts the temporary key using the client's private key and subsequently decrypts the data using the decrypted temporary key. These and other uses are further described in FIGS. 8 and 9.

Figure 8:
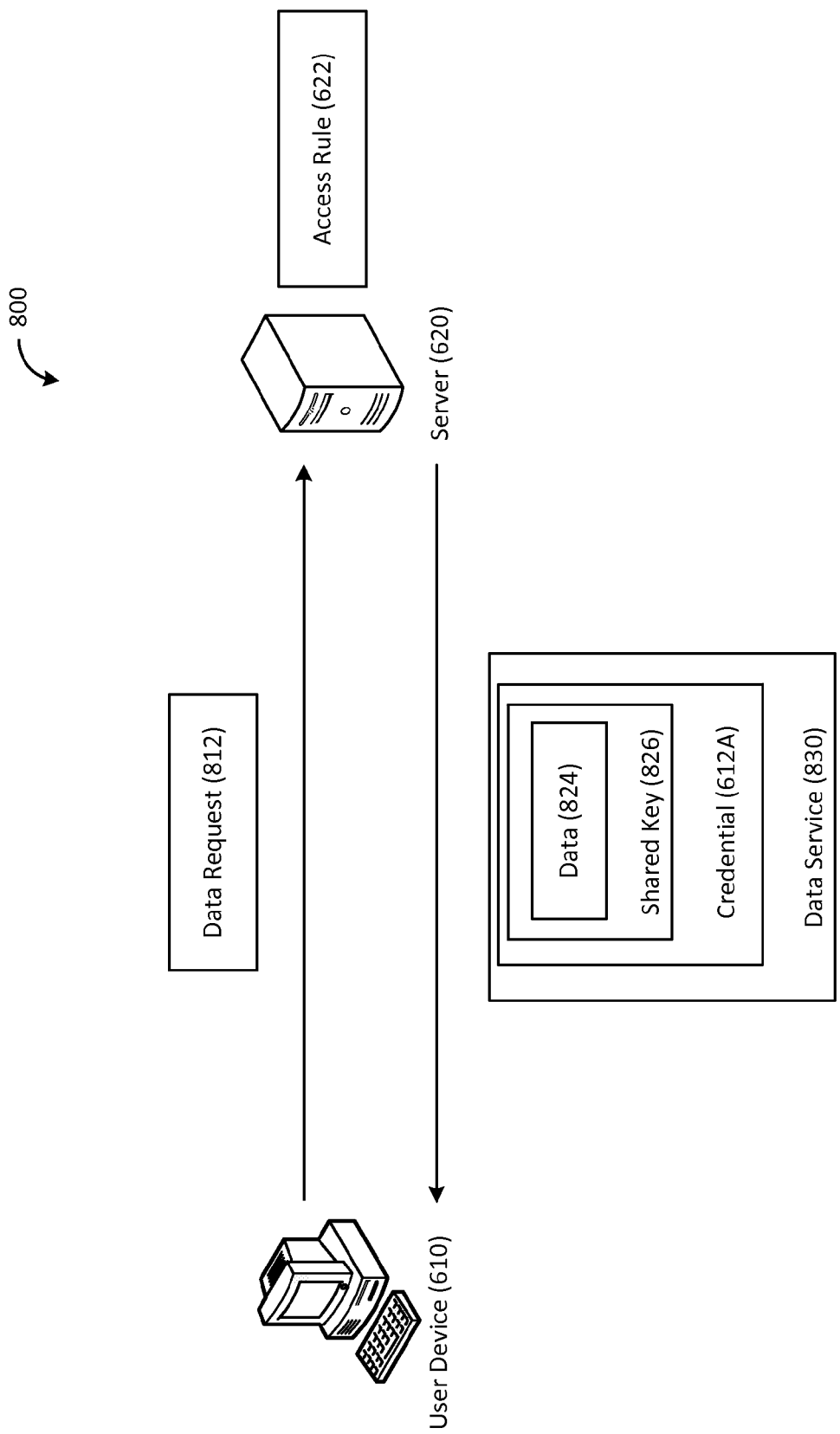
FIG. 8 illustrates an example system for providing a service to a computing device when a user is authenticated and authorized.

FIG. 8 illustrates server 620 providing a data service 830 to user device 610 of FIG. 6 in response to a data request 812 received from the user device. This service is provided after authenticating the user and verifying that authorization policy 612C and access control rule 622 authorize the service. In an example, data service 830 includes transmitting data 824 from server 620 to user device 610 and implements a secure mechanism to protect the data.

The secure mechanism includes multiple layers of data encryption. As described herein above, user device 610 and server 620 share a cipher, shown in FIG. 8 as a shared key 826, that the server uses to encrypt data 824. The server also encrypts the encrypted data and shared key 826 with the user's credential 612A for transmission to the user device. To access data 824, user device 610 decrypts the received information using the user's private key to retrieve shared key 826 and decrypts data 824 based on the decrypted shared key.

Figure 9:
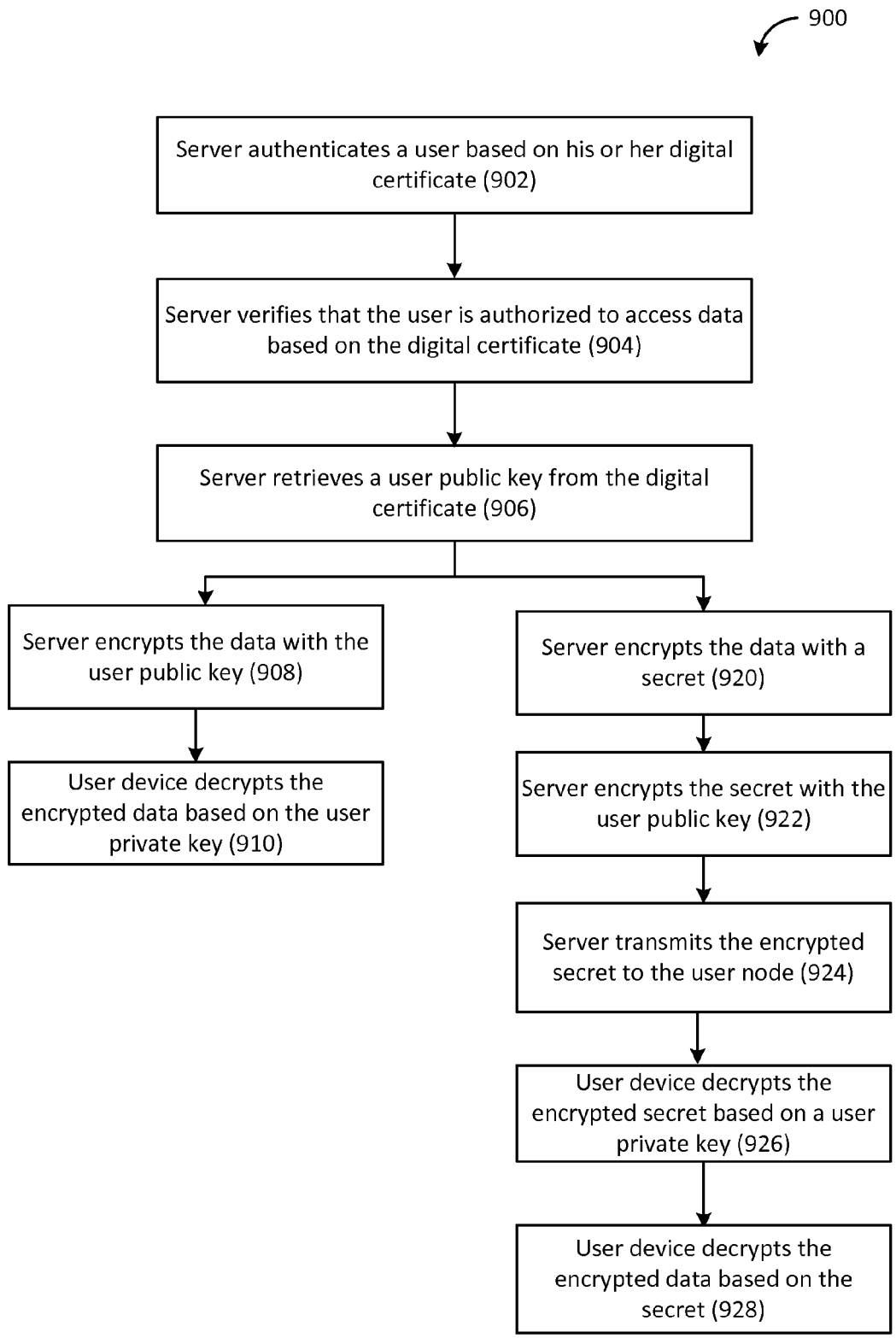
FIG. 9 is a flowchart depicting an example procedure for providing a service to a computing device when a user is authenticated and authorized.

FIG. 9 is a flowchart depicting an example procedure for providing data service 830 of FIG. 8 and may be performed by server 620 and user device 610. Operation 902 illustrates the server authenticating the user based on the digital certificate associated. Operation 904 illustrates the server verifying that the user is authorized to access data managed by the server based on the digital certificate and, as applicable, based on the access rule. When the user is authorized, the server allows the data access by executing any of operations 906, 908 and 920-924.

Operation 906 illustrates the server retrieving the credential, such as a public key, associated with the user from the digital certificate. Operation 906 may be followed by operation 908 or operation 920 based on various secure mechanisms that may be implemented by one skilled in the art. Operation 908 illustrates the server encrypting the data using the user's public key and transmitting the encrypted data to the user device. Operation 910 illustrates the user device decrypting the received data using the user's private key associated with the user's public key.

Operation 920 illustrates the server encrypting the data with a secret. The secret can be a shared key that the server shares with the user device. The secret can also be associated with a connection session between the user device and the server and can be disposed of when the server terminates the secure connection. Operation 922 illustrates the server encrypting the secret with the user's public key. This encryption protects the secret from being used by a computing device other than the user device and the server. The server also encrypts the data with the secret, which results in a first set of encrypted data. The server further encrypts the first set with the user's public key, which results in a second set of encrypted data. The second set provides additional protection to the data because of the dual encryption. This layering of encryption can be repeated by using additional secrets and public keys associated with the user.

Operation 924 illustrates the server transmitting the encrypted secret and the second set of encrypted data to the user device. Operation 926 illustrates the user device receiving the encrypted secret and decrypting the secret using the user's private key. The user device also decrypts the received data with the user's private key to retrieve the first layer of encrypted data. Operation 928 illustrates the user device retrieving the secret and decrypting the first layer of encrypted data using the retrieved secret. The user device retrieves and processes the data from the decrypted first layer for display to the user at a user interface.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

A computing node, such as a user device, an administrator device, a certificate authority or a server, may be implemented on a wide variety of computing environments, such as commodity-hardware computers, virtual machines, computing clusters and computing appliances. Any of these computing devices or environments may, for convenience, be described as computing nodes.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method of controlling access by a client node to a server node, the method comprising:
    transmitting from the client node a digital certificate associated with a user of the client node over a network to the server node in conjunction with a request to authenticate the user, the digital certificate comprising information indicative of a policy configured to authorize the user associated with the digital certificate based at least in part on a location restriction;
    receiving over a network, from the server node, information indicative that the user was granted access to a resource associated with the server node, the access being based at least in part on the information indicative of the policy; and
    accessing the resource associated with the server node based at least in part on the authentication and the authorization.

2. The method of claim 1, wherein the location restriction comprises a geographic boundary, and wherein the policy authorizes the user to use the digital certificate within the geographic boundary.

3. The method of claim 1, wherein the policy comprises a determination of a location associated with the resource with respect to the location restriction.

4. The method of claim 1, wherein accessing the resource comprises:
    receiving information from the server node, the information being encrypted with a secret key;
    retrieving the secret key by way of the digital certificate; and
    decrypting the information based on the retrieved secret key.

5. A non-transitory computer-readable storage medium bearing instructions for managing access to a computing node that, upon execution on the computing node, cause the computing node to at least:
    retrieve information indicative of a policy associated with a credential in a digital certificate received from a remote computing device, the policy being contained within the digital certificate;
    authenticate a user of the remote computing device based at least in part on the credential in the digital certificate;
    verify that the information indicative of the policy authorizes the remote computing device to access the computing node; and
    provide access to the computing node based at least in part on the authentication and the verification.

6. The non-transitory computer-readable storage medium of claim 5, wherein the credential comprises a public key.

7. The non-transitory computer-readable storage medium of claim 5, wherein the policy authorizes the remote computing device to access the computing node based at least in part on a location of the computing node or a location of the remote computing device.

8. The non-transitory computer-readable storage medium of claim 5, wherein the information indicative of the policy comprises a rule that controls the use of the digital certificate based on a location restriction.

9. The non-transitory computer-readable storage medium of claim 8, wherein the location restriction comprises any of a geographic boundary, a logical boundary, or a jurisdictional boundary.

10. The non-transitory computer-readable storage medium of claim 8, wherein the rule authorizes the use of the digital certificate based on a location of the computing node.

11. The non-transitory computer-readable storage medium of claim 8, wherein the rule authorizes the use of the digital certificate based on a location of the remote computing device.

12. The non-transitory computer-readable storage medium of claim 5 further comprises instructions that, upon execution on the computing node, cause the computing node to at least apply an access rule to determine that the remote computing device is authorized to access the computing node.

13. The non-transitory computer-readable storage medium of claim 12, wherein the access rule comprises a profile of the user, and wherein the profile controls the access to the computing node.

14. The non-transitory computer-readable storage medium of claim 12, wherein the access rule comprises a first geographical boundary for accessing the computing node, wherein the policy comprises a second geographical boundary for using the digital certificate, and wherein the instructions to apply the access rule comprise instructions that, upon execution on the computing node, cause the computing node to compare the first geographical boundary and the second geographical boundary.

15. The non-transitory computer-readable storage medium of claim 5, wherein the instructions to provide access to the computing node comprise instructions that, upon execution on the computing node, cause the computing node to:
  encrypt a shared key associated with the computing node based on a public key associated with the credential; and
  transmit the encrypted shared key to the remote computing device.

16. The non-transitory computer-readable storage medium of claim 15, wherein the instructions to provide access to the computing node further comprise instructions that, upon execution on the computing node, cause the computing node to enable the remote computing device to access and decrypt information hosted on the computing node based on the encrypted shared key.

17. A system for managing access of a computing node to a resource by way of a certificate, the system comprising:
  a memory bearing instructions that, when executed on the system, cause the system to at least:
  retrieve from within the certificate information indicative of a policy, the certificate comprising a credential, the policy comprising a restriction on using the credential;
  determine that the information indicative of the policy authorizes the computing node access the resource; and
  facilitate the access of the computing node to the resource by way of the credential based at least in part on the determination.

18. The system of claim 17, wherein the resource is hosted on the system.

19. The system of claim 17, wherein the resource provides a service to the computing node, wherein the service comprises any of a website hosting service, a logon service for logging into the computing node, a multimedia content streaming service, a compute service, or a data storage service.

20. The system of claim 17, wherein the certificate is a digital certificate that binds the policy to the credential and to information about a user associated with the computing node, the credential being issued to the user.

21. The system of claim 20, wherein the policy limits a use of the credential to a geographic boundary.

22. The system of claim 20, wherein the access of the computing node to the resource by way of the credential comprises retrieving the credential from the digital certificate and using the credential by the resource.

23. The system of claim 20, wherein the digital certificate is issued by an administrator that manages the computing node.

24. The system of claim 20, wherein the credential is generated by the computing node, wherein the policy is defined by an administrator that manages a use of the credential by the user, wherein the digital certificate is signed by a certificate authority, and wherein the policy comprises a rule that authorizes a use of the digital certificate based on a location of the computing node or of the resource.

\* \* \* \* \*